United States Patent [19]

Ward et al.

[11] Patent Number: 4,517,073

[45] Date of Patent: May 14, 1985

[54] HYDROCRACKING PROCESS AND CATALYST THEREFOR

[75] Inventors: John W. Ward, Yorba Linda, Calif.; Timothy L. Carlson, Grand Junction, Colo.

[73] Assignee: Union Oil Company of California, Los Angeles, Calif.

[21] Appl. No.: 406,498

[22] Filed: Aug. 9, 1982

[51] Int. Cl.$^3$ .............................................. C10G 47/20
[52] U.S. Cl. ...................................... 208/111; 502/66
[58] Field of Search .................... 208/111; 502/64, 66, 502/70, 69, 68, 60

[56] References Cited

U.S. PATENT DOCUMENTS

| | | | |
|---|---|---|---|
| 3,130,007 | 4/1964 | Breck | 423/328 |
| 3,251,902 | 5/1966 | Garwood et al. | 585/722 |
| 3,277,018 | 10/1966 | Plank et al. | 252/451 |
| 3,312,615 | 4/1967 | Cramer et al. | 208/110 |
| 3,506,400 | 4/1970 | Eberly, Jr. et al. | 423/328 |
| 3,542,670 | 11/1970 | Erickson et al. | 208/120 |
| 3,640,681 | 2/1970 | Pickert | 423/328 |
| 3,694,345 | 9/1972 | Bittner et al. | 208/111 |
| 3,729,521 | 4/1973 | Gutberlet et al. | 585/475 |
| 3,783,124 | 1/1974 | Rubin et al. | 208/111 |
| 3,835,027 | 9/1974 | Ward | 208/111 |
| 3,835,028 | 9/1974 | Ward | 208/111 |
| 3,838,040 | 9/1974 | Ward | 208/111 |
| 3,853,742 | 12/1974 | Ward | 208/111 |
| 3,897,327 | 7/1975 | Ward | 208/111 |
| 3,926,780 | 12/1975 | Ward | 208/111 |
| 3,929,672 | 12/1975 | Ward | 252/455 Z |
| 3,945,943 | 3/1976 | Ward | 252/455 Z |
| 3,997,618 | 12/1976 | Corneley et al. | 585/481 |
| 4,062,809 | 12/1977 | Ward | 252/455 R |
| 4,085,068 | 4/1978 | Gallagher et al. | 252/455 R |
| 4,097,365 | 6/1978 | Ward | 208/111 |
| 4,115,248 | 9/1978 | Mulaskey | 208/112 |
| 4,120,825 | 10/1978 | Ward | 252/455 Z |
| 4,179,356 | 12/1979 | O'Hara et al. | 208/111 |
| 4,377,468 | 3/1983 | La Pierre et al. | 208/111 |
| 4,401,556 | 8/1983 | Bezman et al. | 208/111 |
| 4,419,271 | 12/1983 | Ward | 502/65 |

FOREIGN PATENT DOCUMENTS 0028938  5/1981  European Pat. Off. ........... 208/111
2906656  2/1978  Fed. Rep. of Germany.

OTHER PUBLICATIONS

"Catalyst Advances Open Doors for Hydrocracking", by Ward et al., in *The Oil and Gas Journal*, May 28, 1973, pp. 69 to 73.

Primary Examiner—Delbert E. Gantz
Assistant Examiner—Anthony McFarlane
Attorney, Agent, or Firm—Dean Sandford; Gregory F. Wirzbicki

[57] ABSTRACT

A hydrocracking process, of especial use in the production of a relatively high yield of middle distillate products along with a smaller but still significant yield of gasoline from high boiling gas oils and the like, comprises contacting a gas oil or other hydrocarbon feedstock under hydrocracking conditions with a novel catalyst comprising one or more hydrogenation components on a support material comprising, in combination, a dispersion of silica-alumina in alumina and a zeolite of the Y crystalline structure but having a silica-to-alumina ratio above about 6.0.

39 Claims, No Drawings

HYDROCRACKING PROCESS AND CATALYST THEREFOR

BACKGROUND OF THE INVENTION

This invention relates to a catalytic hydrocracking process and a catalyst for use therein. More particularly, the invention relates to a hydrocracking catalyst of improved properties for producing middle distillates and gasoline from heavy gas oils and the like under hydrocracking conditions.

Petroleum refiners often produce desirable products such as turbine fuel, diesel fuel, and other products known as middle distillate (or midbarrel) products, as well as lower boiling products, such as naphtha and gasoline, by hydrocracking a hydrocarbon feedstock derived from a crude oil. Feedstocks most often subjected to hydrocracking are gas oils and heavy gas oils recovered as a fraction from a crude oil by distillation. The typical gas oil comprises a substantial proportion of hydrocarbon components boiling above about 700° F., usually at least about 80% by weight boiling above about 700° F.

Hydrocracking is generally accomplished by contacting, in an appropriate reactor vessel, the gas oil or other feedstock to be treated with a suitable hydrocracking catalyst under suitable conditions of elevated temperature and pressure in the presence of hydrogen so as to yield a product containing a distribution of hydrocarbon products required by (or satisfactory to) the refiner. Although the operating conditions within a hydrocracking reactor are of obvious importance in influencing the yield of product or products, the hydrocracking catalyst is of vital importance in this regard. Many catalysts are known for hydrocracking, but since their respective catalytic properties vary widely, it can be appreciated that hydrocracking catalysts having great usefulness for one purpose, as for example, for maximizing gasoline and naphtha production, are unsuitable for many other purposes, as for example, maximizing the yield of turbine fuel. And even among catalysts useful for producing the same product, the usefulness of each varies according to the requirements of the refiner. For example, a catalyst having high activity for maximum middle distillate (or midbarrel) production under relatively severe conditions may prove inferior for other purposes, as for example, where a relatively large yield of middle distillate product plus a smaller but still significant yield of gasoline is desired from a gas oil feedstock under relatively moderate hydrocracking conditions of elevated temperature and pressure.

The present invention is directed to a catalytic hydrocracking process primarily of advantage in producing a relatively large yield of middle distillate (or midbarrel) products boiling in the 300° to 700° F. range under relatively moderate operating conditions while also producing a significant yield of gasoline.

Accordingly, it is a major object of the invention to provide a catalytic hydrocracking process utilizing a novel hydrocracking catalyst of superior properties for producing a relatively large yield of middle distillate products from gas oils and the like under relatively moderate hydrocracking operating conditions. A more specific object of the invention is to provide a catalytic hydrocracking process for treating hydrocarbon feedstocks boiling primarily above 700° F. so as to produce, under relatively moderate hydrocracking conditions, and in the presence of a superior catalyst, a relatively large yield of middle distillate products boiling between about 300° and 700° F. while concomitantly producing a significant yield of a 185° to 300° F. gasoline fraction. These and other objects of the invention will become more apparent in view of the following description of the invention taken together with the Examples.

SUMMARY OF THE INVENTION

It has now been discovered that catalysts comprising an active hydrogenation component, usually selected from the Group VIB and VIII metals and their compounds, on a support comprising (1) a dispersion of silica-alumina in alumina and (2) a zeolite of the Y crystal structure having a silica-to-alumina ratio above about 6.0 are highly useful in hydrocracking. Under typical hydrocracking conditions, including an elevated temperature and pressure and the presence of hydrogen, the catalyst of the invention is highly effective for converting gas oils and other hydrocarbon feedstocks to a product of lower average boiling point and lower average molecular weight. In addition, the catalyst of the invention is highly useful for midbarrel hydrocracking, being effective for converting high boiling gas oils to a product containing a relatively large proportion of components boiling in the midbarrel range of 300° to 700° F. while a smaller but still significant proportion boils in the gasoline range of 185° to 300° F.

DETAILED DESCRIPTION OF THE INVENTION

From one vantage point, the present invention may be seen as an improvement to the hydrocracking catalyst disclosed in U.S. Pat. No. 4,097,365. This catalyst is composed of a combination of nickel and/or cobalt components plus tungsten and/or molybdenum components on a support consisting essentially of a finely divided silica-alumina cogel or copolymer dispersed in an alumina matrix. The present invention improves this catalyst by the addition thereto of a specific zeolite, namely, a zeolite of the Y crystalline structure but having a silica-to-alumina mole ratio greater than about 6.0. Where the catalyst of the prior art U.S. Pat. No. 4,097,365 is primarily directed to obtaining high yields of middle distillate products, the present invention provides for a catalyst highly useful in the production of a relatively high yield of middle distillate product plus a significant yield of gasoline. And as will be shown hereinafter in the Example, the zeolite utilized in the present invention proves highly superior for this purpose, imparting greater activity to the resulting catalyst than is the case for zeolites of the Y type having a silica-to-alumina mole ratio between 3 and 6.

Y zeolites, as disclosed in U.S. Pat. No. 3,130,007 herein incorporated by reference in its entirety, have a silica-to-alumina mole ratio between about 3.0 and 6.0, with the typical Y zeolite being known to have a silica-to-alumina mole ratio of about 5.0. The zeolites used in the present invention, however, have a silica-to-alumina mole ratio above about 6.0, usually above 7.0, preferably above 7.8, and more preferably above about 8.0, but usually no more than about 20.0; highly preferred zeolites have a silica-to-alumina mole ratio between about 8.5 and 15. Such zeolites, as will be shown hereinafter, are usually prepared from a Y zeolite starting material and will thus have the essential X-ray diffraction pattern of Y zeolite. However, it will be understood that, in converting a Y zeolite starting material to a zeolite useful in the present invention, the resulting zeolite may not have exactly the same X-ray diffraction pattern as disclosed in U.S. Pat. No. 3,130,007 for Y zeolite, and this because the d-spacings may be shifted somewhat due to a shrinkage in the unit cell size and also due to the desired increase in the silica-to-alumina ratio. But the essential crystal structure of Y zeolite will be retained, so that the essential X-ray diffraction pattern of the zeolites herein will be consistent with that of either Y zeolite itself or a Y zeolite of reduced unit cell size. (A typical unit cell size for sodium Y zeolite exchanged with ammonium ions to a $(NH_4)_2O$ content of 9.8 weight percent is 24.75 angstroms; the unit cell sizes for zeolites herein are usually below that value, and most usually are no more than about 24.65 angstroms.)

The zeolites used in the preferred catalyst of the present invention are treated to have catalytic activity for cracking hydrocarbons. In order to provide for high catalytic activity, alkali metals, and particularly sodium, are usually removed by ion exchange, usually to a value less than about 1.5 percent by weight, calculated as total alkali metal monoxides, preferably to a value less than 0.5 percent by weight, and even more preferably, to less than 0.2 percent by weight. The zeolite is also usually prepared in the hydrogen form, which may be accomplished, for example, by ion-exchanging ammonium ions into the zeolite and subsequently calcining. Further, the zeolites herein are stabilized so as to resist crystal collapse in the presence of ammonia and/or water vapor, either or both of which may be present when the zeolite is contained in a catalyst employed in a hydrocracking environment. Stabilization may be accomplished by introducing into the zeolite a small proportion of a multi-valent metal cation, such as a rare earth cation, a magnesium cation, and the like, but stabilization is more often accomplished by steam calcining the zeolite when in an ammonium-exchanged form, which steam calcining is most often and preferably followed by yet a further ammonium ion exchange to reduce the sodium content to extremely low levels, i.e., below 0.2 weight percent.

The preferred zeolite for use in the catalyst of the invention is known as LZ-210, a zeolitic aluminosilicate molecular sieve available from Union Carbide Corporation, Linde Division. LZ-210 has an X-ray diffraction pattern consistent with a Y zeolite of reduced unit cell size and may be prepared, for example, so as to have an X-ray diffraction pattern falling in the ranges shown in the following Table I:

TABLE I

| d(A) | Intensity |
|---|---|
| 14.17–13.97 | very strong |
| 8.68–8.55 | medium |
| 7.40–7.30 | medium |
| 5.63–5.55 | strong |
| 4.72–4.66 | medium |
| 4.34–4.28 | medium |
| 3.74–3.69 | strong |
| 3.28–3.23 | strong |
| 2.83–2.79 | strong |

LZ-210 zeolites are conveniently prepared in silica-to-alumina mole ratios between about 6 and 20, although even higher ratios are possible. Preferred LZ-210 zeolites have a silica-to-alumina mole ratio greater than 8.0, and the yet more preferred have a silica-to-alumina mole ratio greater than 8.5. Typically, the unit cell size is at or below 24.65 angstroms, even more typically below 24.55 angstroms, and usually in the range of about 24.20 to 24.55 angstroms. When the silica-to-alumina mole ratio is below 20, LZ-210 zeolites have an adsorption capacity for water vapor at 25° C. and 4.6 mm Hg water vapor partial pressure of at least 20 weight percent based on the anhydrous weight of the zeolite, and preferably an oxygen adsorption capacity at 100 mm Hg and −183° C. of at least 25 weight percent.

Yet another characteristic of LZ-210 zeolites is their resistance to crystal collapse at elevated temperatures. LZ-210 zeolites are stable in dry air at temperatures of at least 975° C., and are most often stable at a temperature of at least 1035° C., with some forms being reported as stable even at 1100° C. and higher. This resistance to crystal collapse contrasts favorably with a typical sodium Y zeolite ion-exchanged with ammonium ions, which collapses at a temperature of about 861° C.

In general, LZ-210 zeolites may be prepared from conventional Y zeolites by contacting a Y zeolite with a fluorosilicate, preferably ammonium fluorosilicate. The contacting is usually accomplished by placing an ammonium-exchanged Y zeolite into an aqueous reaction medium, such as an aqueous solution of ammonium acetate, followed by slow addition of an aqueous fluorosilicate solution. After allowing the reaction to proceed, a zeolite is produced of increased silica-to-alumina mole ratio, with the magnitude of the increase being dependent to a large degree on the amount of fluorosilicate solution contacted with the zeolite and, to a lesser extent, on the reaction time allowed, with 10 to 24 hours usually being sufficient for equilibrium to be achieved. The resulting solid product, which may be separated from the aqueous reaction medium by conventional filtration techniques, is a form of LZ-210 zeolite. In its as-prepared form, however, LZ-210 zeolite is not as highly active for cracking reactions as would be desired on a commercial basis; neither is it highly stable (i.e., resistant to crystal collapse) in a hydrocracking environment. Hence, in the preferred embodiment, the LZ-210 zeolite is subjected to a steam calcination treatment to provide greater crystalline stability, the steam treatment being such that the zeolite is contacted for a time period of ¼ to 3 hours, preferably 1 hour, at an elevated temperature (usually at least 600° F., preferably between 900° and 1500° F., and most preferably between 1000° and 1300° F.) with water vapor at a partial pressure of at least 0.2 p.s.i.a., and preferably with saturated or superheated steam. After steam treatment, the zeolite is then, to render it more catalytically active, subjected to an ammonium ion exchange to reduce the sodium content thereof to extremely low levels, i.e., below 0.2 weight percent (calculated as $Na_2O$).

The following example illustrates one method for preparing LZ-210 zeolite.

EXAMPLE I

Three hundred ninety-six (396) grams of $(NH_4)_2SiF_6$ are dissolved with stirring in 3 liters of distilled water at 50° C. The resulting solution is put into a dropping funnel fitted on a three-necked round-bottom flask. A solution of 6400 grams of ammonium acetate in 8 liters of water is then added to the flask. An 85% ammonium-exchanged zeolite NaY in the amount of 1400 grams (hydrated weight, molar $SiO_2/Al_2O_3=4.85$) is slurried up in the ammonium acetate solution at 75° C. A mechanical stirrer is fitted to the center hole of the flask, which is also fitted with the necessary thermocouples and temperature controllers. Dropwise titration of the 3 liters of (NH$_4$)$_2$SiF$_6$ solution is begun at 75° C. After completion of titration, which requires a period of 2.5 hours, the pH of the slurry is measured as 6.0. Overnight heating of the mixture is conducted at 95° C., the dropping funnel having been replaced with a condenser. At the conclusion of the reaction, the pH of the slurry is 6.75.

The reaction mixture is then filtered as two separate batches, and the solids washed with 18 liters of hot distilled water. There is a residue of (NH$_4$)$_3$AlF$_6$ present in the washed materials. An additional wash of the products in ammonium acetate is performed, followed by a thorough wash with boiling distilled water until qualitative tests cannot detect either aluminum or fluoride ions in the effluent wash water.

The properties of the resultant LZ-210 zeolite material are as follows:

TABLE II

| Chemical Analysis: | | | |
|---|---|---|---|
| Composition By Weight %: | | Molar Composition: | |
| Na$_2$O | 0.66 | Na$_2$O/Al$_2$O$_3$ | = 0.08 |
| (NH$_4$)$_2$O | 6.50 | (NH$_4$)$_2$O/Al$_2$O$_3$ | = 0.91 |
| Al$_2$O$_3$ | 13.97 | Cation Equivalent | = 0.99 |
| SiO$_2$ | 78.55 | Cation Deficiency | = 1% |
| F$^-$ | 0.02 | F$_2$/Al | = 0.005 |
| | | SiO$_2$/Al$_2$O$_3$ | = 9.54 |

The product has the characteristic X-ray powder diffraction pattern of zeolite LZ-210 and a unit cell dimension (a$_o$) of 24.51 Å. From peak intensity measurements, the crystallinity of the product is found to be 94 percent. The water adsorption capacity at 25° C. and 4.6 mm Hg water vapor partial pressure is 28.7 weight percent. The oxygen adsorption capacity at −183° C. and 100 mm Hg oxygen partial pressure is 29.3 weight percent. The crystal-collapse temperature of the product as measured by a standard DTA procedure is 1061° C. Untreated NH$_4$Y using the same DTA technique collapses at 861° C.

The LZ-210 product may be rendered more active for cracking hydrocarbons and more resistant to crystal collapse in a hydrocracking environment by a steam calcination treatment followed by an ammonium ion exchange. In accordance with the preferred embodiment, therefore, the zeolite is steam calcined at 600° C. (1112° F.) for one hour in an atmosphere consisting essentially of steam. The steamed product is then slurried in water containing ammonium nitrate in a weight ratio to the zeolite of 1 to 5. The product is then filtered from the liquid solution, washed, dried, and analyzed for sodium content to determine if it contains less than 0.2 weight percent Na$_2$O. If not, the slurring procedure in the ammonium nitrate solution is repeated until the sodium content is below 0.2 weight percent.

LZ-210 zeolites prepared and treated by methods similar to that described in the preceding Example are incorporated into the support material of the catalyst of the present invention. The support material utilized in the catalyst of the invention usually comprises between 10 and about 80% by weight, preferably between about 20 and about 70% by weight, more preferably between 25 and 50% by weight, and most preferably between 30 and 45% by weight, of the crystalline aluminosilicate zeolite. The support also comprises, in intimate admixture with the zeolite, a substantial proportion of a heterogeneous dispersion of finely divided silica-alumina in an alumina matrix. Usually, the dispersion comprises at least 15% by weight of the support, with the preferred, more preferred, and most preferred proportions being in the respective ranges of 30 to 80%, 40 to 75%, and 45 to 70% by weight of the support.

One convenient method for preparing the catalyst support herein is to comull an alumina hydrogel with a silica-alumina cogel in hydrous or dry form. The cogel is preferably homogeneous and may be prepared in a manner such as that described in U.S. Pat. No. 3,210,294. Alternatively, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer (either of which usually comprises silica in a proportion by dry weight of 20 to 96%, preferably 50 to 90%) is mulled with the alumina hydrogel such that the cogel or copolymer comprises 5 to 75% by weight, preferably 20 to 65% by weight, of the mixture. The overall silica content of the resulting dispersion on a dry basis is usually between 1 and 75% by weight, preferably between 5 and 45% by weight.

The mulled mixture of alumina gel with either a silica-alumina cogel or a silica and alumina "graft copolymer" may be utilized in the gel form or may be dried and/or calcined prior to combination with the zeolite. In the preferred method of preparation, the cogel or copolymer is spray-dried and then crushed to a powdered form, following which the powder is mulled with an appropriate zeolite powder usually containing hydrogen ions, hydrogen ion precursors, or multivalent metal-containing cations. The amounts of cogel or copolymer mulled with the zeolite are such that the support will ultimately contain zeolite and dispersion in the proportions set forth hereinbefore. If desired, a binder may also be incorporated into the mulling mixture, as also may one or more active metal hydrogenation components in forms such as ammonium heptamolybdate, nickel nitrate or chloride, ammonium metatungstate, cobalt nitrate or chloride, etc. After mulling, the mixture is extruded through a die having suitable openings therein, such as circular openings of diameters between about 1/32 and ⅛ inch. Preferably, however, the die has openings therein in the shape of three-leaf clovers so as to produce an extrudate material similar to that shown in FIGS. 8 and 8A of U.S. Pat. No. 4,028,227. The extruded material is cut into lengths of about 1/32 to ¾ inch, preferably ¼ to ½ inch, dried, and calcined at an elevated temperature.

If desired, the hydrogenation components may be composited with the support by impregnation; that is, rather than comulling the hydrogenation components with the support materials, the zeolite and dispersion are mulled, extruded, cut into appropriate lengths, and calcined. The resulting particles are then contacted with one or more solutions containing the desired hydrogenation components in dissolved form, and the composite particles thus prepared are dried and calcined to produce finished catalyst particles.

Usually, the finished catalyst contains at least about 0.5% by weight of hydrogenation components, calculated as the metals. In the usual instance, wherein a Group VIII metal and a Group VIB metal component are utilized in combination, the finished catalyst contains between about 5% and 35%, preferably between about 10 and 30% by weight, calculated as the respective trioxides, of the Group VIB metal components and between about 2% and 15%, preferably between 3 and 10% by weight, calculated as the respective monoxides, of the Group VIII metal components. The preferred Group VIII metals are the iron group metals, and particularly nickel and cobalt, with nickel being especially preferred. The preferred Group VIB metals are molybdenum and tungsten, with tungsten being most especially preferred.

If desired, a phosphorus component may also be incorporated in the catalyst by either comulling the support materials with phosphoric acid or including phosphoric acid in the impregnating solution. Usual and preferred proportions of phosphorus in the catalyst fall in the respective ranges of 1 to 10% by weight and 3 to 8% by weight, calculated as $P_2O_5$.

The hydrogenation components, which will largely be present in their oxide forms after calcination in air, may be converted to their sulfide forms, if desired, by contact at elevated temperatures in a reducing gas atmosphere comprising hydrogen sulfide. Most commonly, the sulfiding is accomplished in situ, as by placing the catalyst in its oxide form in the reactor vessel wherein the hydrocracking reactions are to be performed and then passing a mixture of hydrogen and hydrogen sulfide or hydrogen and carbon disulfide through the catalyst bed under conditions of elevated temperature. Alternatively, the catalyst may be placed in the reactor vessel and then contacted, under hydrocracking conditions and in the presence of a sulfur component, with the hydrocarbon feedstock to be catalytically converted to lower boiling hydrocarbons. The sulfur component may be an organosulfur component present in the feedstock, or it may be hydrogen sulfide added from an external source. Alternatively still, the hydrogen sulfide may accompany the feedstock itself, as would be the case, for example, if the hydrocracking operation is performed immediately after hydrotreating. These and other well-known methods for activating the catalyst by conversion to the sulfide form may be utilized in the invention.

The catalyst of the invention is particularly useful for hydrocracking a hydrocarbon feedstock to a hydrocarbon product of lower average boiling point and lower average molecular weight. The feedstocks that may be subjected to hydrocracking by the method of the invention include all mineral oils and synthetic oils (e.g., shale oil, tar sand products, etc.) and fractions thereof. Illustrative feedstocks include straight run gas oils, vacuum gas oils, deasphalted vacuum and atmospheric residua, coker distillates, cycle oils, and catcracker distillates. The typical hydrocracking feedstock will be a gas oil or other hydrocarbon fraction having at least 50% by weight, and most usually at least 80% by weight, of its components boiling at temperatures above 700° F. The most useful gas oil feedstock will consist essentially of hydrocarbon components boiling above about 550° F. (that is, more than about 90 volume percent boils above 550° F.) while the heavier gas oils will boil essentially completely above 700° F., with those gas oils having an end boiling point above about 950° F. and usually between 1000° and 1300° F. being specifically contemplated for treatment in the hydrocracking process of the invention.

The process of the invention is most preferably utilized in conjunction with a catalytic hydrotreating operation, that is, the feedstock to be subjected to hydrocracking in the process of the invention most usually comprises, and more usually still consists essentially of, the entire effluent from a catalytic hydrotreater wherein, in the presence of a hydrotreating catalyst usually comprising Group VIII and VIB metal components on a porous refractory oxide, such as a sulfided catalyst containing nickel and/or coblt components plus molybdenum and/or tungsten components on alumina, the sulfur and nitrogen components in a hydrocarbon liquid are converted by reaction with hydrogen at elevated temperatures and pressures to hydrogen sulfide and ammonia, respectively. In the preferred method of operation, therefore, hydrotreating will precede hydrocracking, and thus, the feedstock most usually subjected to hydrocracking in the process of the present invention will be a hydrotreated feedstock, such as a hydrotreated gas oil or a hydrotreated cycle oil.

In the process of the invention, the hydrocracking conditions are adjusted so as to obtain a substantial degree of cracking per pass of hydrocarbon feed over the catalyst. Usually, the cracking per pass is such as to convert at least 30% by volume, preferably at least 35% by volume, of the hydrocarbon components boiling above an end point (typically 700° F. in the case of diesel fuel, and 550° F. in the case of turbine fuels) to hydrocarbon products boiling below the desired end point. Under such cracking conditions, and with a typical gas oil, the product distribution is generally such that, of the products boiling in the range of $C_4$ hydrocarbons to the desired end point of the middle distillate product, the middle distillate product boiling between 300° F. and the end point comprises more than 50% by volume, usually more than 65% by volume, and oftentimes more than about 70% by volume, while the 185° to 300° F. gasoline fraction comprises at least about 15 percent by volume, usually at least about 20 percent by volume, and oftentimes between about 20 and 25 percent by volume.

The exact conditions, of course, required to produce a desired result in any given hydrocracking process will depend primarily on the feedstock and the desired midbarrel product, with the boiling point characteristics of the feedstock and desired midbarrel product being particularly important factors in determining the conditions of operation. In general, however, the conditions of operation for hydrocracking gas oil feedstocks and the like in the process of the invention will fall into the following ranges:

TABLE III

|  | Suitable | Preferred |
|---|---|---|
| Temperature, °F. | 500–900 | 600–800 |
| Pressure, p.s.i.g. | 750–3500 | 1000–3000 |
| LHSV | 0.3–5.0 | 0.5–3.0 |
| $H_2$/Oil, MSCF/bbl | 1–10 | 2–8 |

Although it is contemplated that the hydrocracking process of the invention may be carried out on a once-through basis, with collection of unconverted feed components, it is more desirable and preferable, especially on a commercial basis, to operate with recycle of unconverted feed components boiling above the maximum desired midbarrel end point. Operation with recycle under ideal conditions converts the feedstock to extinction (i.e., a 100% conversion to products boiling below the maximum desired temperature of the middle distillate product). More usually, however, one must operate with a bleed of unconverted feed components, resulting in a conversion over 90% but not quite to extinction.

One of the advantages of the catalyst of the invention is that its properties allow a petroleum refiner a certain degree of flexibility when operating under relatively moderate hydrocracking conditions. Where some hydrocracking catalysts are primarily designed for the maximum production of either gasoline or midbarrel products under relatively severe conditions, the present catalyst under relatively moderate conditions (relative to the feedstock involved) has properties most advantageously utilized to produce a relatively large yield of middle distillates plus a significant yield of gasoline. Further, depending upon production demands, one may, while utilizing relatively moderate conditions, alter the yield of midbarrel distillate products, shifting, for example, from a large 300° to 700° F. diesel fuel plus some gasoline yield to a large 300° to 550° F. turbine fuel yield with an accompanying increase in gasoline yield. And if the occasion demands, the operating conditions may be adjusted for complete gasoline production or maximum middle distillate production, depending on the feedstock involved. Thus, the invention provides for a superior "flexible" midbarrel hydrocracking catalyst, which is of most advantageous use in those situations wherein a relatively large yield of midbarrel products is primarily desired, but wherein it will occasionally be necessary to shift to maximum gasoline or maximum middle distillate production for short periods of time.

The catalyst of the invention proves to be a highly superior hydrocracking catalyst. The three main catalytic properties by which the performance of a hydrocracking catalyst may be evaluated are activity, selectivity, and stability. The activity of a hydrocracking catalyst is a measure of its effectiveness for promoting (or accelerating) hydrocracking reactions. The activity of one hydrocracking catalyst relative to others may be determined by comparing the temperature at which the catalysts under otherwise constant hydrocracking conditions with the same feedstock prove useful for converting a given percentage (e.g., 35% or 45%) of the hydrocarbons in the feedstock boiling above a specific temperature (usually 700° F. in the case of midbarrel catalysts) to products boiling at or below that temperature. The lower the temperature required for a given catalyst, the more active such a catalyst is for hydrocracking purposes. However, although a catalyst may be highly active for hydrocracking, if the product hydrocarbons boil largely in an undesired range, as would be the case, for example, if a refiner desired a large yield of diesel fuel boiling in the 300° to 700° F. range but instead obtained a large yield of gasoline boiling below 300° F., then the catalyst proves unsuitable for the refiner's purpose. Thus, in addition to high activity, it is important that the catalyst be highly selective for the products desired, with the selectivity being calculated as the volumetric percentage fraction (or fractions) of hydrocarbon products boiling in a desired range (or ranges) to those products boiling from some specified low value (as for example the boiling point of $C_4$ hydrocarbons) to the end point of the desired products. The third important property of a hydrocracking catalyst is stability, that is, its resistance to loss in activity. Thus, stability is a measure of how well a catalyst maintains its activity over an extended time period when treating a given hydrocarbon feedstock. Stability is generally measured in terms of the change in reactor temperature required per day to provide a given conversion, e.g., the 35% or 45% conversion used in the activity test described hereinabove.

In the following Examples, it will be shown by comparative data with respect to activity, selectivity, and stability that the catalyst of the invention is highly superior to other catalysts for hydrocracking gas oil feedstocks to obtain a relatively large yield of midbarrel products along with a smaller but still significant yield of gasoline. More specifically, it will be shown that the catalyst of the invention, compared to catalysts containing a zeolite in either an alumina support or in a support further containing a dispersion of silica-alumina in alumina, proves superior in terms of overall stability, selectivity, and activity, with the catalyst of the invention especially exhibiting far superior activity. Accordingly, one may utilize the catalyst of the invention at far lower operating temperatures than with the comparison catalysts—and thereby save on energy costs—but achieve a similar hydrocrackate product. (It is noted, however, that the Examples are provided to illustrate the superior nature of the catalyst of the invention for midbarrel hydrocracking; none of the Examples in the present specification is intended to limit the invention which is defined by the claims.)

EXAMPLE II

A number of catalysts are individually activity-tested according to the following method. A hydrotreated light Arabian vacuum gas oil having the chemical and physical properties shown in the following Table IV:

TABLE IV

| Distillation Vol. %, | °F. | | |
|---|---|---|---|
| | | Gravity, °API | 30.8 |
| IBP/5 | 203/563 | Pour Point, °F. | 95.0 |
| 10/20 | 649/727 | Sulfur, XRF, wppm | 183 |
| 30/40 | 765/786 | Nitrogen, wppm | 8.3 |
| 50/60 | 811/843 | Hydrogen, wt. % | 13.33 |
| 70/80 | 871/908 | Viscosity, SSU at 210° F. | 40.5 |
| 90/95 | 963/983 | | |
| EP/% Rec. | 1000/98.3 | | | is passed on a once-through basis through an isothermal reactor vessel containing a 140 ml sample of catalyst particles mixed with 160 ml of 10 to 20 mesh quartz. Operating conditions are as follows: 1.0 LHSV, 2,000 p.s.i.g., a once-through hydrogen flow of 10,000 scf/bbl, and a run length (except in one instance) of approximately 10 days. The temperature of the reactor is adjusted to provide a 43.5 volume percent conversion to products boiling at 700° F. or less. In addition, tert-butyl amine and thiophene are added to the reactor in amounts commensurate with the amounts of $NH_3$ and $H_2S$, respectively, that would be present from hydrotreating the gas oil from which the feedstock of Table IV was derived, i.e., a light Arabian vacuum gas oil containing about 2.37% by weight sulfur and 780 wppm of nitrogen. Thus, the conditions under which the catalysts are tested simulate those one would expect to pertain in a hydrocracking vessel employed in an integral hydrotreating-hydrocracking operation wherein the entire effluent from the hydrotreater, plus added hydrogen, is passed to the hydrocracker for further refinement, in this case, conversion primarily to a middle distillate product. (In this simulation, the crack per pass in the hydrocracking zone itself, as stated above, is 43.5 vol.%; but the overall crack per pass through the integral hydrotreating-hydrocracking system, based on the unhydrotreated feedstock, is 60 vol.%.)

The compositions of the catalysts tested in accordance with the foregoing procedure are specified in Table V. As shown, each of the catalysts contains nickel plus molybdenum or tungsten active components, and the supports of the catalysts contain varying proportions of one of three stabilized zeolites, two being LZ-10 and LZ-210, both proprietary zeolites of Union Carbide, and the third, a stabilized Y zeolite prepared in accordance with the method of U.S. Pat. No. 3,929,672 herein incorporated by reference in its entirety. The three zeolites may be distinguished from each other at least by their water adsorption properties and their silica-to-alumina ratios. The stabilized Y zeolite is hydrophilic and has a silica-to-alumina mole ratio between about 3 and 6. The LZ-10 zeolite, on the other hand, although also having a silica-to-alumina mole ratio between about 3 and 6, is extremely hydrophobic, usually adsorbing no more than about 5% by weight water under conditions wherein a typical hydrophilic Y zeolite would adsorb more than about 20% water. In contrast to LZ-10, LZ-210 is hydrophilic, and in contrast to both the LZ-10 and the stabilized Y zeolite, LZ-210 zeolite has a silica-to-alumina mole ratio higher than that of a Y zeolite, that is, higher than 6.0. In the case of the two LZ-210 zeolites listed in Table V, the silica-to-alumina mole ratio is 8.3.

270° arc of a circle having a diameter between about 0.02 and 0.04 inches. The particulates are of a length between about ¼ and ½ inch, are calcined in air, and sulfided prior to testing with a hydrogen sulfide-containing gas. The results obtained with each catalyst are shown in the following Table V.

TABLE V

| Run No. | Catalyst Composition Active Components | Support[2] | Activity[5] Reactor Temp. to Provide 60% Conv. | Selectivity[6] Vol. % Conv. to 300°–700° F. Product | Stability °F./day |
|---------|-----------------------------------------|------------|------------------------------------------------|------------------------------------------------------|---------------------|
| 18-513  | 7.5% NiO—23.2% MoO$_3$                  | 60% LZ-10 + 30% Dispersion | 695° F. | 72.9 | 0.4 |
| 18-541  | 3.5% NiO—23.0% WO$_3$                   | 40% LZ-10 + 40% Dispersion | 688° F. | 76.0 | 3.5 |
| 18-514  | 6.5% NiO—15.1% MoO$_3$                  | 90% LZ-10                  | 692° F. | 73.1 | 1.4 |
| 18-517  | 6.4% NiO—17.6% MoO$_3$—6.8% P$_2$O$_5$ | 20% Stabilized Y[3] + 60% Al$_2$O$_3$ | 697° F. | 71.1 | nil |
| 18-515  | 3.5% NiO—23.0% WO$_3$[1]                | 20% Stabilized Y[3] + 60% Dispersion | 687° F. | 71.4 | nil |
| 18-532  | 3.5% NiO—23.0% WO$_3$[1]                | 30% Stabilized Y[3] + 50% Dispersion | 677° F. | 71.2 | nil |
| 18-531  | 3.5% NiO—23.0% WO$_3$[1]                | 40% Stabilized Y[3] + 40% Dispersion | 667° F. | 71.1 | nil |
| 18-535  | 3.5% NiO—23.0% WO$_3$                   | 50% Stabilized Y[3] + 30% Dispersion | 664° F. | 68.8 | nil |
| 18-537  | 3.5% NiO—23.0% WO$_3$                   | 40% LZ-210[4] + 40% Dispersion | 658° F. | 72.5 | nil |
| 18-538  | 4.5% NiO—22.4% WO$_3$                   | 50% LZ-210[4] + 30% Dispersion | 658° F. | 67.9 | nil |

[1]Values for the active components of these catalysts are approximate; the others in Table V are determined analytically. Catalysts indicated by footnote 1 may have an NiO content between about 3.0 and 3.5 wt. % and a WO$_3$ content between about 20 and 23 wt. %.
[2]The balance of all support compositions is peptized Catapal ™ alumina binder, the binder comprising 10% of the support in Runs Nos. 18-513 and 18-514 and 20% of the support in all other runs.
[3]These stabilized Y zeolites are all prepared in accordance with U.S. Pat. No. 3,929,672 and have a soidum content below about 0.2%, calculated as Na$_2$O.
[4]The LZ-210 zeolites have a silica-to-alumina mole ratio of 8.3, a unit cell size of 24.51 Å, and are steam calcined and ammonium ion-exchanged to less than 0.2 wt. % Na, calculated as Na$_2$O.
[5]Activity data indicate the operating temperature on the tenth day of run, except in the case o Run No. 18-541 which is run for only six days. The indicated activity temperature of 688° F. for this run is based on an extrapolation from data derived on day six.
[6]Selectivity data of middle distillate are an average of data over each run and are calculated as the percentage fraction of 300° to 700° F. product components to C$_4$ to 700° F. product components.

In addition to containing one of the three specified zeolites, the catalysts set forth in Table V are further composed of either alumina plus a binder material or a dispersion of silica-alumina in alumina plus a binder material. The dispersion is prepared in a spray-dried, powdered form by a method similar to that of Example 3 of U.S. Pat. No. 4,097,365, herein incorporated by reference. However, instead of admixing 33 parts by dry weight of a 75/25 silica-alumina graft copolymer and 67 parts by weight of hydrous alumina gel, about 60 parts and about 40 parts, respectively, are utilized. As a result, the dispersion utilized in the catalysts shown in Table V consists essentially, on an overall basis, of about 45% by weight silica and about 55% by weight alumina.

Each of the foregoing catalysts is prepared in particulate form having a cross-sectional shape similar to a three-leaf clover, each leaf being defined by about a In addition to the data shown in Table V, it is also determined that, for each run, the gasoline yield of components boiling between about 185° and 300° F. to the total components in the product boiling in the C$_4$ to 700° F. range is between about 19.8 and 25.1 volume percent, with Runs Nos. 18-537 and 18-538 respectively providing 22.5 and 23.4 volume percent yields. Taken as a whole, then, the data obtained from the runs indicate that, when conditions are adjusted to produce about a 70% to 75% yield of a 300° to 700° F. diesel fuel product and about a 20% yield of a 185° to 300° F. gasoline product, the catalyst of the invention (in Runs 18-537 and 18-538) proves superior in activity to the stabilized Y compositions by between about 6° and 39° F. And in comparison to the LZ-10 compositions, the invention proves more superior still, being not only about 30° to 37° F. more active but far more stable. These data are indicative of a highly superior catalyst, and the data with respect to activity are particularly significant. From kinetic considerations, it is known that an activity differential of about 27° F. of one catalyst over another roughly translates into a doubling in catalytic activity, that is, the more active catalyst has activity for providing essentially the same product from the same feedstock as the less active catalyst under similar hydrocracking conditions but at twice the space velocity. Therefore, the activity improvements ranging between 6° and 39° F., as shown in Table V, demonstrate that the catalyst of the invention is between about 1.2 and 2.4 times as active as the comparison catalysts.

Additional data taken from the comparative experiment described above indicate that the turbine fuel portion of the desired 300° to 700° F. middle distillate product is relatively high. These data, which supplement the data in Table V, are tabulated as follows:

TABLE VI

| Run No. | Zeolite in Catalyst Support | Turbine Fuel Selectivity, Vol %[1] |
|---|---|---|
| 18-513 | 60% LZ-10 | 50.5 |
| 18-541 | 40% LZ-10 | 51.2 |
| 18-514 | 90% LZ-10 | 50.8 |
| 18-517 | 20% Stabilized Y | 50.8 |
| 18-515 | 20% Stabilized Y | 50.3 |
| 18-532 | 30% Stabilized Y | 50.1 |
| 18-531 | 40% Stabilized Y | 51.1 |
| 18-535 | 50% Stabilized Y | 50.6 |
| 18-537 | 40% LZ-210 | 51.5 |
| 18-538 | 50% LZ-210 | 49.8 |

[1]Based on an averaging of data over the run and calculated as the percentage fraction of 300° to 550° F. turbine fuel product components to $C_4$ to 700° F. product components.

In view of the data in Tables V and VI, it can be seen that the catalyst of the invention, in addition to being far more active than the other catalysts, provides a comparable yield of turbine fuel products under the conditions of the experiment. Of course, if the comparative experiment of the Examples were performed under conditions designed specifically to provide a high yield of turbine fuel plus a significant yield of gasoline (instead of a high yield of a 300° to 700° F. diesel fuel plus a significant yield of gasoline), it can be seen that somewhat more severe conditions would be necessary to provide a 43.5% crack per pass to products boiling below 550° F. (or other desired turbine fuel end point, usually between about 525° and 600° F.) as opposed to the conditions of the experiment directed to a 43.5% crack per pass to products boiling below 700° F. Under the more severe conditions producing a higher yield of turbine fuel, it can also be expected that the gasoline yield would increase somewhat as well, usually to above about 20% by volume of all products boiling in the range of $C_4$ hydrocarbons to the desired end point of the turbine fuel product.

Thus, the data obtained from the experiment of the Example indicate that the catalyst of the invention is highly useful and superior for converting gas oil feedstocks and the like to midbarrel products, whether a diesel fuel or a turbine fuel product is desired. Also, it is apparent that along with the desired midbarrel product one also obtains a 185° to 300° F. gasoline product in a yield greater than about 10%, usually above about 14% by volume, of the $C_4$ to 700° F. products. Thus, for purposes of "flexible" midbarrel hydrocracking wherein a refiner desires a relatively high yield of middle distillate products while also producing a significant yield of gasoline, it can be seen that the invention provides a highly active and stable catalyst.

EXAMPLE III

Another experiment is performed to compare the properties of three catalysts, containing, in respective equivalent 40% proportions by weight of the support, a stabilized Y zeolite containing less than 0.2 weight percent sodium (as $Na_2O$), an LZ-210 zeolite having a silica-to-alumina mole ratio of 6.1 and a unit cell size of 24.65 angstroms, and an LZ-210 zeolite having a silica-to-alumina ratio of 9.1 and a unit cell size of 24.52 angstroms. In other respects, the catalysts are similar, having about 3 to 3.5 weight percent nickel (as NiO) and about 20 to 23 weight percent tungsten (as $WO_3$) and a support consisting essentially of 40% zeolite, 20% alumina binder, and 40% dispersion, the dispersion being similar to that described in Example II.

The test procedure employed is the same as that described in Example II except that (a) a more difficult-to-process hydrotreated light Arabian gas oil feedstock is employed and (b) the conditions are adjusted for a 37.4 volume percent crack per pass (which, as in Example II, corresponds to a 60 volume percent crack per pass based on the unhydrotreated feedstock). The hydrotreated feedstock has the properties indicated in the following Table VII:

TABLE VII

| Distillation, °F. | | Gravity, °API | 29.8 |
|---|---|---|---|
| Vol. % | °F. | Pour Point, °F. | 91 |
| IBP/5 | 282/534 | Sulfur, XRF, wppm | 282 |
| 10/20 | 587/686 | Nitrogen, wppm | 14.7 |
| 30/40 | 740/778 | Hydrogen, wt. % | 13.53 |
| 50/60 | 808/839 | Viscosity, SSU at 210° F. | 42.2 |
| 70/80 | 871/916 | | |
| 90/85 | 967/1017 | | |
| EP %/Rec | 1069/98.8 | | |

The results of the experiment are summarized in the following Table VIII:

TABLE VIII

| Catalyst | Activity[1] Reactor Temperature to Provide 60% Conversion | Middle Distillate Selectivity[2] Vol. % Conversion to 300° to 700° F. Product | Turbine Selectivity[3] Vol. % conversion to 300° to 550° F. Product | Stability °F./day |
|---|---|---|---|---|
| Nickel-Tungsten on 40% Stabilized Y and 40% Dispersion (Run No. 18-569) | 677° F. | 70.1 | 48.4 | Nil |
| Nickel-Tungsten on 40% LZ-210 of 9.1 $SiO_2$:$Al_2O_3$ and 40% Dispersion (Run No. 18-570) | 650° F. | 73.7 | 51.7 | Nil |
| Nickel-Tungsten on 40% LZ-210 of 6.1 $SiO_2$:$Al_2O_3$ and 40% Dispersion | 666° F. | 71.2 | 50.1 | Nil |

TABLE VIII-continued

| Catalyst | Activity[1] Reactor Temperature to Provide 60% Conversion | Middle Distillate Selectivity[2] Vol. % Conversion to 300° to 700° F. Product | Turbine Selectivity[3] Vol. % conversion to 300° to 550° F. Product | Stability °F./day |
|---|---|---|---|---|
| (Run No. 18-567) | | | | |

[1]Activity data indicate the operating temperature on the tenth day of run.
[2]Selectivity data of middle distillates are an average of data taken over each run and are calculated as the percentage fraction of 300° to 700° F. product components to C₄ to 700° F. product components.
Note:
The 300° to 700° F. range is typical for diesel fuels.
[3]Turbine fuel selectivity are based on an averaging of data over each run and is caluclated as the percentage fraction of 300° to 550° F. turbine fuel product components to C₄ to 700° F. product components.

The data in Table VIII indicate the clear superiority of LZ-210 zeolite in comparison to stabilized Y zeolite when used in hydrocracking catalysts of otherwise similar composition. Of particular importance is the data relative to the catalyst of the invention containing an LZ-210 zeolite of 9.1 silica-to-alumina mole ratio. This catalyst is 16° F. more active than its 6.1 silica-to-alumina LZ-210 counterpart, and 27° F. more active—indicating a doubling in activity—than the catalyst containing stabilized Y zeolite. Also, since the stabilized Y zeolite catalyst of the present Example was of the same composition as that in Run No. 18-531 of Example II, it can be seen that, with this catalyst as a reference catalyst, the combined data of Tables V and VIII indicate that the best results of any catalyst tested in Examples II and III is the one containing LZ-210 in a 9.1 silica-to-alumina mole ratio. For this reason, zeolites containing silica and alumina in at least a 9 to 1 molar ratio are most preferred.

It should also be noted that the gasoline yield data for the three runs tabulated in Table VII indicate significant yields of gasoline in each instance, with the yield (relative to the C₄ to 700° F. product) being 23.8 volume percent for the catalyst containing the stabilized Y zeolite, 21.7 percent for the catalyst containing the LZ-210 zeolite of 9.1 silica-to-alumina mole ratio, and 23.3 percent for the catalyst containing the LZ-210 zeolite of 6.1 mole ratio.

In view of the foregoing description of the invention, including the Examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

We claim:

1. In a catalytic hydrocracking process, the improvement comprising contacting a hydrocarbon feedstock with a hydrocracking catalyst under hydrocracking conditions producing a product hydrocarbon of lower average molecular weight than said feedstock, said catalyst comprising an active hydrogenation metal component on a support comprising in admixture a dispersion of silica-alumina in alumina and a crystalline aluminosilicate zeolite having the zeolite Y crystal structure, a silica-to-alumina mole ratio above about 6.0, and a water adsorption capacity at 25° C. and 4.6 mm Hg water vapor partial pressure of at least 20 percent by weight of the zeolite in its anhydrous form.

2. In a catalytic hydrocracking process, the improvement comprising contacting a hydrocarbon feedstock with a hydrocracking catalyst under hydrocracking conditions producing a product hydrocarbon of lower average molecular weight than said feedstock, said catalyst comprising a Group VIB or Group VIII active metal component on a support comprising in admixture a dispersion of silica-alumina in alumina and a crystalline aluminosilicate zeolite having catalytic cracking activity, a silica-to-alumina mole ratio above about 6.0, an X-ray diffraction pattern consistent with a Y zeolite of unit cell size of 24.75 angstroms or less, and a water adsorption capacity at 25° C. and 4.6 mm Hg water vapor partial pressure of at least 20 percent by weight of the zeolite in its anhydrous form.

3. A process as defined in claim 1 or 2 wherein the alkali metal content of said zeolite is less than 0.5 weight percent.

4. A process as defined in claim 3 wherein said silica-to-alumina mole ratio is between 8.5 and 15.

5. A process as defined in claim 1 or 2 wherein the silic-to-alumina mole ratio of said zeolite is between about 8.5 and 15.

6. A process as defined in claim 2 wherein said catalyst comprises a Group VIII metal component selected from the group consisting of nickel, cobalt, and the compounds thereof, and a Group VIB metal component selected from the group consisting of molybdenum, tungsten, and the compounds thereof.

7. A process as defined in claim 1, 2, or 6 wherein said feedstock is converted to a product hydrocarbon containing hydrocarbons boiling in the C₄ to 700° F. range, of which hydrocarbons at least 50 volume percent boil in the 300° to 700° F. middle distillate range and at least 15 volume percent boil in the 185° to 300° F. gasoline range.

8. A process as defined in claim 7 wherein at least about 50% of the components in said hydrocarbon feedstock boil above 700° F., and of said components, at least 90% by volume are converted during said contacting to products boiling below 700° F.

9. A process as defined in claim 8 wherein said zeolite has a silica-to-alumina mole ratio above about 8.5.

10. A process as defined in claim 9 wherein said zeolite comprises between about 30% and 45% by weight of said support.

11. A process as defined in claim 10 wherein said zeolite has a sodium content below about 0.5 percent by weight.

12. A process as defined in claim 11 wherein said dispersion comprises a silica-alumina containing between about 50% and 90% by weight silica dispersed in gamma alumina.

13. A process as defined in claim 12 wherein at least 65% by volume of said hydrocarbons boiling in the C₄ to 700° F. range boil in the 300° to 700° F. middle distillate range and at least about 20% by volume boil in the 185° to 300° F. gasoline range.

14. A process as defined in claim 7 wherein at least 50% by volume of the components in said hydrocarbon feedstock boil above 550° F., and of said components, at least 60% by volume are converted during said contacting to product components boiling below 550° F.

15. A process as defined in claim 14 wherein said product hydrocarbon consists a substantial proportion of product components boiling in the $C_4$ to 700° F. range, with those product components boiling in the 300° to 550° F. turbine fuel range comprising at least 40% by volume of the total $C_4$ to 700° F. product components.

16. A process as defined in claim 15 wherein, of said product components boiling in the $C_4$ to 700° F. range, at least about 50 volume percent boil in the 300° to 550° F. turbine fuel range and at least 15 volume percent boil in the 185° to 300° F. gasoline range.

17. In a catalytic hydrocracking process, the improvement comprising contacting a hydrocarbon feedstock with a hydrocracking catalyst under hydrocracking conditions producing a substantial number of product hydrocarbon components boiling in the $C_4$ to 700° F. range, with more than 50 volume percent of said product hydrocarbon components being a middle distillate product boiling in the range of about 300° to 700° F. and at least about 15 volume percent of said components being a gasoline product boiling in the range of about 185° and 300° F., said hydrocracking catalyst comprising a nickel or cobalt active metal component and a molybdenum or tungsten active metal component on a support comprising in intimate admixture (1) a dispersion of silica-alumina in alumina and (2) a zeolite comprising at least 25 percent by weight of said support and having an X-ray powder diffraction pattern consistent with a Y zeolite of unit cell size below about 24.55 angstroms, a $SiO_2$ to $Al_2O_3$ ratio above 6, and a water adsorption capacity at 25° C. and 4.6 mm Hg water vapor partial pressure of at least 20 percent by weight of the zeolite in its anhydrous form.

18. A process as defined in claim 17 wherein said zeolite has a silica-to-alumina mole ratio between 8.5 and 15.0 and comprises more than 30 percent by weight of said hydrocracking catalyst.

19. A process as defined in claim 18 wherein said middle distillate product comprises more than about 65 percent by volume of said $C_4$ to 700° F. product hydrocarbon components.

20. A process as defined in claim 18 wherein said middle distillate product comprises more than about 70 percent by volume of said $C_4$ to 700° F. product hydrocarbon components.

21. A process as defined in claim 20 wherein said gasoline product comprises more than about 20 percent by volume of said $C_4$ to 700° F. product hydrocarbon components.

22. A process as defined in claim 18 wherein at least 50 percent by volume of the components in said hydrocarbon feedstock boils above about 550° F., and of said components, at least 90 percent by volume are converted during said contacting to products boiling below 550° F.

23. A process as defined in claim 17, 18, 21, or 22 wherein said zeolite contains less than about 0.2 percent by weight of alkali metals, calculated as the monoxides.

24. A process as defined in claim 23 wherein said zeolite has a unit cell size between 24.20 and 24.55 angstroms, and an oxygen adsorption capacity at 100 mm Hg and −183° C. of at least 25 weight percent, said zeolite retaining substantially all its crystallinity at a temperature of 975° C. in dry air.

25. A process as defined in claim 1, 6, 18, 21, or 22 wherein said zeolite has a unit cell size between 24.20 and 24.55 angstroms, and an oxygen adsorption capacity at 100 mm Hg and −183° C. of at least 25 weight percent, said zeolite retaining substantially all its crystallinity at a temperature of 975° C. in dry air.

26. A process as defined in claim 2, 17, 19, or 22 wherein said zeolite has a unit cell size between 24.20 and 24.55 angstroms, and an oxygen adsorption capacity at 100 mm Hg and −183° C. of at least 25 weight percent, said zeolite retaining substantially all its crystallinity at a temperature of 975° C. in dry air and having a silica-to-alumina mole ratio between 8.5 and 12.0.

27. In a catalytic hydrocracking process, the improvement comprising contacting a hydrocarbon feedstock with a hydrocracking catalyst under hydrocracking conditions, including the presence of hydrogen, producing a product hydrocarbon of lower average molecular weight than said feedstock, said catalyst comprising a Group VIB or Group VIII metal component in intimate admixture with a dispersion of silica-alumina in alumina and a zeolite, said zeolite being prepared by a method comprising:
(1) contacting a Y zeolite with a fluorosilicate compound, said Y zeolite having been at least partially cation-exchanged to contain ammonium cations and said contacting yielding a resultant zeolite having a silica-to-alumina mole ratio above 6.0; and
(2) calcining the resultant zeolite at an elevated temperature in the presence of water vapor at a partial pressure of at least 0.2 p.s.i.a., said calcined zeolite having a water adsorption capacity at 25° C. and 4.6 mm Hg water vapor partial pressure of at least 20 percent by weight of the zeolite in its anhydrous form.

28. A process as defined in claim 27 wherein said fluorosilicate contacted with said Y zeolite in step (1) comprises an aqueous liquid solution of ammonium fluorosilicate, and wherein, after calcination in step (2), the sodium content of the resulting zeolite is reduced by cation exchange with ammonium cations.

29. A process as defined in claim 27 or 28 wherein a substantial proportion of said feedstock is converted during said contacting to a product hydrocarbon boiling in the $C_4$ to 700° F. range, of which product hydrocarbon at least 50 percent by volume is a middle distillate product boiling in the 300° to 700° F. range and at least 15 percent by volume is a gasoline product boiling in the 185° to 300° F. gasoline range.

30. A process as defined in claim 29 wherein said middle distillate product comprises more than about 65 percent by volume of said $C_4$ to 700° F. product hydrocarbon.

31. A process as defined in claim 29 wherein said middle distillate product comprises more than about 70 percent by volume of said $C_4$ to 700° F. product hydrocarbon.

32. A process as defined in claim 31 wherein said gasoline product comprises more than about 20 percent by volume of said $C_4$ to 700° F. product hydrocarbon.

33. A process as defined in claim 29 wherein at least 50 percent by volume of the components in said hydrocarbon feedstock boils above about 550° F., and of said components, at least 90 percent by volume are converted during said contacting to products boiling below 550° F.

34. A process as defined in claim 1, 6, or 17 wherein said silica-to-alumina ratio is no greater than about 20 and said silica-alumina comprises 5 to 75 percent by weight of the dispersion.

35. A process as defined in claim 19, 20, 21, or 22 wherein said silica-alumina comprises between about 5 and 75 percent by weight of the dispersion.

36. A process as defined in claim 27 or 28 wherein said resultant zeolite has a sodium content less than about 0.5 percent by weight.

37. A process as defined in claim 29 wherein said resultant zeolite has a sodium content less than about 0.5 percent by weight.

38. A process as defined in claim 32 wherein said resultant zeolite has a sodium content less than about 0.5 percent by weight.

39. A process as defined in claim 33 wherein said resultant zeolite has a sodium content less than about 0.5 percent by weight.

* * * * *

UNITED STATES PATENT AND TRADEMARK OFFICE
CERTIFICATE OF CORRECTION

PATENT NO. : 4,517,073
DATED : May 14, 1985
INVENTOR(S) : John W. Ward and Timothy L. Carlson It is certified that error appears in the above-identified patent and that said Letters Patent are hereby corrected as shown below:

The first page should show the following:

-- Related U.S. Application Data

Continuation-in-part of Ser. No. 84,761, Oct. 15, 1979, Pat. No. 4,419,271. --

Column 1, after the title and before "Background of the Invention" insert:

-- CROSS-REFERENCE TO RELATED APPLICATIONS

This application is a continuation-in-part of application Serial No. 84,761, filed in the United States Patent and Trademark Office on October 15, 1979 and now U.S. Patent No. 4,419,271. --

Column 15, line 34, change "VII" to -- VIII --.

Column 16, line 32, change "silic-to-alumina" to -- silica-to-alumina --.

Column 17, line 7, change "consists" to -- contains --.

Signed and Sealed this

Twenty-fourth Day of June 1986

[SEAL]

Attest:

DONALD J. QUIGG

Attesting Officer      Commissioner of Patents and Trademarks